(12) United States Patent
Yamane et al.

(10) Patent No.: US 8,896,151 B2
(45) Date of Patent: Nov. 25, 2014

(54) ELECTRIC POWER SYSTEM

(75) Inventors: Toshihiro Yamane, Tokyo (JP); Shigeo Numata, Tokyo (JP); Eisuke Shimoda, Tokyo (JP); Morihiro Kinoshita, Tokyo (JP)

(73) Assignee: Shimizu Corporation, Tokyo (JP)

( * ) Notice: Subject to any disclaimer, the term of this patent is extended or adjusted under 35 U.S.C. 154(b) by 559 days.

(21) Appl. No.: 13/062,085

(22) PCT Filed: Nov. 11, 2010

(86) PCT No.: PCT/JP2010/070086
§ 371 (c)(1),
(2), (4) Date: May 20, 2011

(87) PCT Pub. No.: WO2011/151939
PCT Pub. Date: Aug. 12, 2011

(65) Prior Publication Data
US 2011/0291483 A1    Dec. 1, 2011

(30) Foreign Application Priority Data

May 31, 2010 (JP) ................................ 2010-123825

(51) Int. Cl.
*H02J 7/00* (2006.01)
*H02J 9/00* (2006.01)
*H02J 9/06* (2006.01)
*H02J 7/35* (2006.01)

(52) U.S. Cl.
CPC ................. *H02J 9/06* (2013.01); *Y02E 10/566* (2013.01); *Y02B 10/72* (2013.01); *H02J 7/35* (2013.01)
USPC .................... 307/64; 307/65; 307/66; 307/23

(58) Field of Classification Search
USPC .............................................. 307/23, 64–66
See application file for complete search history.

(56) References Cited

U.S. PATENT DOCUMENTS 5,747,887 A * 5/1998 Takanaga et al. ............... 307/64
2008/0124595 A1* 5/2008 Muramatsu .................... 429/22
(Continued)

FOREIGN PATENT DOCUMENTS

EP        1122856 A2     8/2001
JP     04-325832 A      11/1992
(Continued)

OTHER PUBLICATIONS

International Search Report of PCT/JP2010/070086, date of mailing Feb. 8, 2011.
(Continued)

*Primary Examiner* — Jared Fureman
*Assistant Examiner* — Aqeel Bukhari
(74) *Attorney, Agent, or Firm* — Westerman, Hattori, Daniels & Adrian, LLP

(57) ABSTRACT

An electric power system includes: an uninterruptible power supply including an AC switch provided between a commercial power supply and an output part, a secondary battery, and an inverter provided between the AC switch and secondary battery; an important load connected to the output part; a distributed power supply connected to the output part; total load power consumption detection section detecting the power consumption of all loads including the important load; charge/discharge power detection section detecting charge/discharge power of the secondary battery; output power detection section detecting the output power of the distributed power supply; important load power consumption detection section detecting the power consumption of the important load; and a controller that inputs thereto detection values from the total load power consumption detection section, charge/discharge detection section, output power detection section, and important load power consumption detection section and outputs a control command value for controlling the secondary battery.

1 Claim, 5 Drawing Sheets

(56) References Cited

U.S. PATENT DOCUMENTS

| | | |
|---|---|---|
| 2011/0210608 A1* | 9/2011 | O'Brien et al. .................. 307/31 |
| 2012/0043819 A1* | 2/2012 | Kang et al. ...................... 307/80 |

FOREIGN PATENT DOCUMENTS

| | | |
|---|---|---|
| JP | 2000-092720 A | 3/2000 |
| JP | 2001-161098 A | 6/2001 |
| JP | 2002-374629 A | 12/2002 |
| JP | 2005-160286 A | 6/2005 |
| JP | 2007-215290 A | 8/2007 |
| JP | 2008-295160 A | 12/2008 |
| WO | 2004/054065 A1 | 6/2004 |
| WO | 2006/138592 A2 | 12/2006 |
| WO | 2010/038152 A1 | 4/2010 |

OTHER PUBLICATIONS

Japanese Notice of Rejection dated Jan. 29, 2014, issued in corresponding Japanese application No. 2010-123824 (4 pages).

Search Report dated Jun. 18, 2014, issued in corresponding Singaporean Patent Application No. 201101564-1 (12 pages).

* cited by examiner

ELECTRIC POWER SYSTEM

TECHNICAL FIELD

The present invention relates to a microgrid-based electric power system including a small-sized distributed power supply.

BACKGROUND ART

In a conventional electric power system, energy supply has been conducted from a power plant such as an atomic power plant, a thermal power plant, a hydraulic power plant, etc, by means of a large-scale power grid. Meanwhile, in recent years, a concept called "microgrid" in which a small-sized distributed power supply (photovoltaic, wind turbine, biomass, etc.) is connected to constitute a power network for energy supply to a predetermined area has been proposed and is now becoming widespread. Such a microgrid-based energy supply system realized by the small-sized distributed power supply is required to perform connected operation that controls power generation based on system connection such that purchasing electric power from a commercial system becomes constant at normal operation time, while in the event of emergency such as power failure, to perform load following operation which is islanded operation that supplies high quality (fluctuation in voltage and frequency are small) power to a microgrid system.

In constructing the microgrid, how the amount of power supply, which varies momentarily, is balanced is the most important issue. As factors causing the power supply amount to vary, a variation in a load, a variation in the power generation of a small-sized distributed power supply such as wind turbine power generation or photovoltaic power generation (hereinafter, variations in the wind turbine power generation and photovoltaic power generation are collectively referred to as "electric power variation"), and the like can be exemplified.

The electric power variation has various frequency components from quite abrupt variation to comparatively gentle variation depending on the load or power generation state of the small-sized distributed power supply. By combining distributed power supplies having various load following characteristics, it is possible to suppress the variation of all the frequency components of the electric power variation. Specifically, storage facility such as a secondary battery or an electric storage facility is used to cope with a variation (quite abrupt variation) in high-frequency components and a power generation facility such as a gas engine is used to cope with a variation (comparatively gentle variation) in low-frequency components, whereby the electric power variation can be suppressed.

Further, there is known a system that realizes the load following operation by managing power demand of a building by linkage of power receiving/transforming facility of a commercial system and a distributed power supply (refer to, e.g., Patent Document 1) and a method that utilizes a storage facility when an original operation plan has been significantly modified, to realize stable system operation (refer to, e.g., Patent Document 2).

Patent Document 1: JP-A-2005-160286
Patent Document 2: JP-A-2007-215290

DISCLOSURE OF THE INVENTION

Problems to be Solved by the Invention

With reference to FIG. 7, a configuration example of a conventional microgrid will be described. FIG. 7 illustrates an example of a system configuration in which, at power failure time, power supply is performed by combining an emergency power generator 190 and photovoltaic power generation using a photovoltaic power supply 140. A part surrounded by a chain line in FIG. 7 corresponds to a configuration of an uninterruptible power supply 100.

In an electric power system as illustrated in FIG. 7, during connected operation with a commercial system, a first circuit breaker 191 and an ACSW (AC semiconductor switch) are in a closed state, while a second circuit breaker 192 is in an open state and, in this state, output of a secondary battery 130 is controlled in accordance with a variation in photovoltaic power generation or electric power load to thereby perform peak-cut operation.

Meanwhile, at power failure time, the first circuit breaker 191 is opened, and the ACSW is opened in accordance with a state signal of the first circuit breaker 191. At the same time, the emergency power generator 190 is started up. After startup of the emergency power generator 190, the second circuit breaker 192 is closed to perform islanded operation while utilizing photovoltaic power generation output.

Assuming that in the electric power system illustrated in FIG. 7, the maximum charge/discharge power of the secondary battery 130 is −90 kW to 90 kW, the maximum generating power of the photovoltaic power supply 140 is 90 kW, and the maximum power consumption of an important load 150 is 50 kW, the forward maximum power flow and backward maximum power flow in the ACSW 120 of FIG. 7 are as follows. The definitions of the forward direction (+) and backward direction (−) are as indicated in FIG. 7.

The backward maximum power flow (at fine weather) is calculated as "maximum discharge power (−90 kW) of secondary battery 130+maximum output (−90 kW) of photovoltaic power supply 140−minimum value (0 kW) of important load 150=−180 (kW)".

The forward maximum power flow (at cloudy/rainy weather) is calculated as "maximum discharge power (90 kW) of secondary battery 130+maximum output (0 kW) of photovoltaic power supply 140−minimum value (50 kW) of important load 150=140 (kW)".

For example, the power flow in the ACSW 120 can be in a range of −180 kW to 140 kW depending on the output of the secondary battery 130 or photovoltaic power supply 140 or magnitude of the important load 150, so that assuming that the withstand capacity of the ACSW 120 is in a range of −90 kW to 90 kW, the power flow in the ACSW 120 become excessive, causing the ACSW 120 to be damaged.

In order to cope with this problem, it can be considered that the ACSW 120 in the uninterruptible power supply 100 is replaced with one with higher withstand capacity. However, the ACSW 120 with high withstand capacity is expensive and replacement of the ACSW 120 with one with higher withstand capacity increases cost for constructing the electric power system.

Means for Solving the Problems

The present invention has been made to solve the above problem, and the invention according to claim 1 is an electric power system including: an uninterruptible power supply including an AC switch provided between a commercial power supply and an output part, a secondary battery, and an inverter provided between the AC switch and secondary battery; an important load connected to the output part; a distributed power supply connected to the output part; a total load power consumption detection means for detecting the power consumption of all loads including the important load; a charge/discharge power detection means for detecting charge/discharge power of the secondary battery; an output power detection means for detecting the output power of the distributed power supply; an important load power consumption detection means for detecting the power consumption of the important load; and a controller that inputs thereto detection values from the total load power consumption detection means, charge/discharge power detection means, output power detection means, and important load power consumption detection means and outputs a control command value for controlling the secondary battery. The controller determines the control command value for operating the secondary battery based on the detection values from the total load power consumption detection means, charge/discharge power detection means, output power detection means, and important load power consumption detection means.

Advantages of the Invention

According to the electric power system of the present invention, performing output control of the secondary battery allows the power flow in the AC switch (ACSW) constituting the uninterruptible power supply to be controlled adequately, preventing the AC switch from being damaged. This eliminates the need to increase the withstand capacity of the AC switch to be used to thereby suppress cost increase. Further, in the case where the output of the distributed power supply such as the photovoltaic power supply is large while the power consumption of the important load is small, the secondary battery is charged. This allows a reduction in the installed capacity of the secondary battery.

BEST MODE FOR CARRYING OUT THE INVENTION

Figure 1:
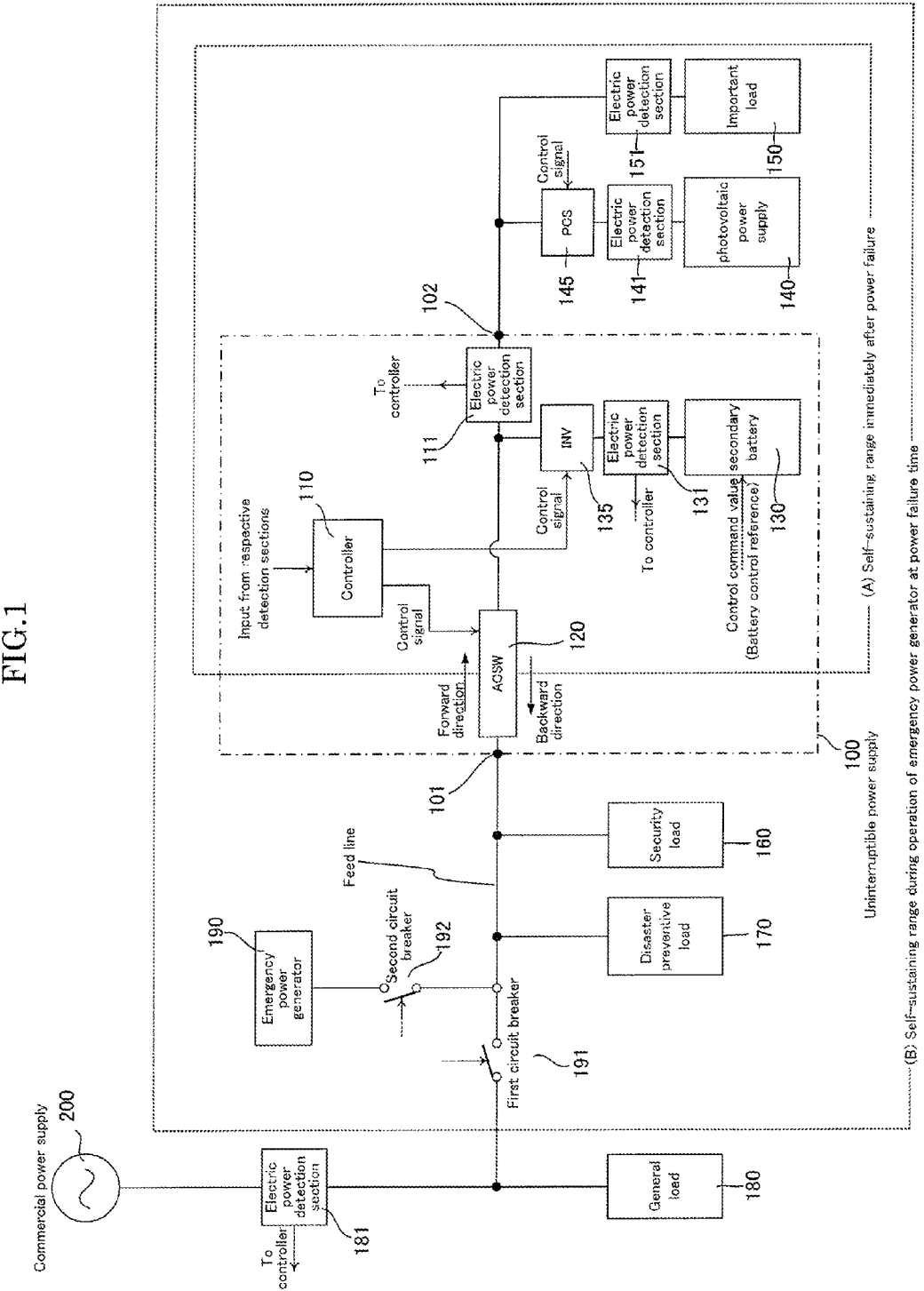
FIG. 1 is a view illustrating the outline of an electric power system according to an embodiment of the present invention.

An embodiment of the present invention will be described below with reference to the accompanying drawings. FIG. 1 is a view illustrating the outline of an electric power system according to the embodiment of the present invention. In FIG. 1, reference numeral 100 denotes an uninterruptible power supply, 101 denotes an input section, 111 denotes an electric power detection section, 102 denotes an output part, 110 denotes a controller, 120 denotes an AC switch (ACSW), 130 denotes a secondary battery, 131 denotes an electric power detection section, 135 denotes an inverter, 140 denotes a photovoltaic power supply, 145 denotes a power conditioner, 150 denotes an important load, 160 denotes a security load, 170 denotes a disaster preventive load, 180 denotes a general load, 181 denotes an electric power detection section, 190 denotes an emergency power generator, 191 denotes a first circuit breaker, 192 denotes a second circuit breaker, and 200 denotes a commercial power supply. Note that FIG. 1 illustrates only a wire connection and a control system for a single phase, i.e., one phase. Further, in the electric power system according to the present embodiment, a range (A) including the most important load (150) and being made islanded even immediately after power failure and a range (B) being made islanded during operation of the emergency power generator 190 at power failure time are defined.

For example, it is assumed that in the present embodiment, the maximum charge/discharge power of the secondary battery 130 is −90 kW to 90 kW, the maximum generating power of the photovoltaic power supply 140 is 90 kW, the maximum power consumption of an important load 150 is 50 kW, and the withstand capacity of the ACSW 120 is in a range of −90 kW to 90 kW. The definitions of the forward direction (+) and backward direction (−) in the ACSW 120 are as indicated in FIG. 1.

In FIG. 1, the general load 180 is connected to a feed line extending from the commercial power supply 200 of a commercial system, and when the feed line falls into an abnormal state such as power failure or the like, power supply thereto is cut off. The security load 160 serving as a load for security and disaster preventive load 170 serving as a load for disaster prevention are loads of high importance and are connected to the feed line via the first circuit breaker 191. To the connection line of the security load 160 and disaster preventive load 170, the emergency power generator 190 and important load 150 are connected via the second circuit breaker 192 and AC switch (ACSW) 120, respectively. When the feed line loses power, power is supplied from the emergency power generator 190 to the respective loads. The important load 150, which is, e.g., a server, is a load having higher importance than the security load 160 and disaster preventive load 170. To the connection line of the important load 150, the secondary battery 130 and photovoltaic power supply 140 are connected via the inverter (INV) 135 and power conditioner (PCS) 145, respectively so as to enable islanded operation even if the feed line loses power and emergency power generator 190 is stopped.

The emergency power generator 190 is activated using heavy oil or other fuel as a power source when the feed line of the commercial power supply 200 falls into an abnormal state (power failure). During the abnormal state, the emergency power generator 190 continues operating so as to supply power to the security load 160, disaster preventive load 170, and important load 150 in place of the commercial power supply 200. However, the abnormal state of the feed line of the commercial power supply 200 continues for a long time and accordingly the emergency power generator 190 continues operating for a long time, fuel is exhausted (fuel shortage) with the result that the operation of the emergency power generator 190 is stopped. Even after the exhaustion of the fuel of the emergency power generator 190, power supply to the important load 150 continues as long as power generation using the photovoltaic power supply 140 is maintained and secondary battery 130 is charged.

The secondary battery 130 is a repeatedly chargeable/dischargeable capacitor or secondary battery. The secondary battery 130 is connected to the connection line of the important load 150 via the inverter 135 so as to be changed by the commercial power supply 200, photovoltaic power supply 140, and emergency power generator 190 according to need and to discharge power to the general load 180, security load 160, disaster preventive load 170, and important load 150. The secondary battery 130 incorporates a control circuit (charge/discharge control circuit) for controlling charge/discharge of the secondary battery. To the control circuit, a control command value from the controller to be described later is input, and charge/discharge of the secondary battery constituting the secondary battery 130 is controlled in accordance with the input control command value.

The inverter 135 is an electric power converter that can convert bidirectionally between AC and DC power. The inverter 135 converts AC power into DC power in an operation mode in which the secondary battery 130 is charged from the commercial power supply 200, photovoltaic power supply 140, or emergency power generator 190 and converts DC power into AC power in an operation mode in which power is discharged from the secondary battery 130 to the important load 150.

The photovoltaic power supply 140 is connected to the connection line of the important load 150 via the power conditioner 145 so as to supply power output to the general load 180, security load 160, disaster preventive load 170, and important load 150 in an independent manner. The power conditioner 145 converts the DC output of the photovoltaic power supply 140 that is not adapted to a predetermined frequency or voltage of the connection line of the important load 150 into predetermined AC power for adaptation of the frequency or voltage to that of the electric power supplied along the feed line. The power conditioner 145 includes, at its output part, a current control type inverter so as to supply the maximum possible power.

The first circuit breaker 191 is closed at general connected operation time where the feed line of the commercial power supply 200 to which the general load 180 is connected is in a feeding state and is opened (turned off) when the feed line of the commercial power supply 200 loses power. The second circuit breaker 192 is opened when the first circuit breaker 191 is closed to put the feed line of the commercial power supply 200 into a feeding state and is closed when the feed line of the commercial power supply 200 loses power. When this second circuit breaker 192 is closed, the emergency power generator 190 is activated, and the generated output of the emergency power generator 190 is fed to the security load 160, disaster preventive load 170 and important load 150. When the emergency power generator 190 is stopped, the second circuit breaker 192 is opened.

The electric power detection section 181 detects power failure occurring in the feed line of the commercial power supply 200 and controls close/open of the first and second circuit breakers 191 and 192 and activation/stop of the emergency power generator 190. When the feed line of the commercial power supply 200 loses power, a power failure detection controller 11 opens the first circuit breaker 191, closes the second circuit breaker 192, and activates the emergency power generator 190. When the power failure of the feed line of the commercial power supply 200 is recovered, the power failure detection controller 11 closes the first circuit breaker 191, opens the second circuit breaker 192, and stops the emergency power generator 190.

An electric power system in the islanded range immediately after power failure includes the AC switch (ACSW) 120, inverter 135, secondary battery 130, and important load 150. The AC switch (ACSW) 120 provided between the commercial power supply AC6 (200?) and inverter 135 corresponds to a signal phase and includes two thyristors Th1 and Th2 (not illustrated) connected in inverse parallel.

When the commercial power supply 200 is in a normal condition (including recovery state) and power needs to be supplied to the range (A), power flows in the forward direction in the AC switch (ACSW) 120, and AC power is supplied from the commercial power supply 200 to the secondary battery 130 or important load 150 via the AC switch (ACSW) 120.

Meanwhile, when the commercial power supply 200 falls into a power failure state, the AC switch (ACSW) 120 is put into a cut-off state to stop supply of AC power from the commercial power supply 200. When an abnormality occurs in the commercial power supply 200, the AC switch (ACSW) 120 is put into a cut-off state as in the case where it falls into a power failure state to stop supply of AC power from the commercial power supply 200.

Further, in the case where surplus power is generated in the range (A) by the discharge of the secondary battery 130, output of the photovoltaic power supply 140, and the like, power flows in the backward direction in the AC switch (ACSW) 120, whereby power can be supplied from the secondary battery 130 or photovoltaic power supply 140 to the security load 160, disaster preventive load 170, or general load 180.

The uninterruptible power supply 100 includes at least the AC switch (ACSW) 120 provided between the commercial power supply 200 and an output part 102, secondary battery 130, and inverter 135 provided between the AC switch (ACSW) 120 and secondary battery 130. Further, the uninterruptible power supply 100 includes the controller 110, which may be subjected to control by a higher-level controller.

The controller 110 is a main controller for performing various control tasks for the electric power system according to the present invention. The control tasks of the controller 110 may be realized by using a general-purpose information processor provided with a CPU, a RAM, a ROM, and the like and by previously storing in the ROM a program allowing the CPU to execute operation of outputting a command to a predetermined block based on an input predetermined information.

The electric power detection section 131 is provided between the inverter (INV) 135 and secondary battery 130, and charge/discharge of the secondary battery 130 can be detected by the electric power detection section 131. A value detected by the electric power detection section 131 is transmitted to the controller 110.

The electric power detection section 111 is provided between the power conditioner (PCS) 145 and AC switch (ACSW) 120, and the sum of the electric energy of the photovoltaic power supply 140 and important load 150 can be detected by the electric power detection section 111. A value detected by the electric power detection section 111 is transmitted to the controller 110.

The electric power detection section 181 is provided in the middle of the feed line extending from the commercial power supply 200 and functions as a total load power consumption detection means for detecting the power consumption of all the loads including the important load 150 (however, power supplies from the secondary battery 130, photovoltaic power supply 140, and emergency power generator 190 are excluded). A value detected by the electric power detection section 181 is transmitted to the controller 110.

In the electric power system according to the present invention, the controller 110 outputs a control signal at least to the AC switch (ACSW) 120, inverter 135 in the secondary battery 130, power conditioner 145, secondary battery 130 (charge/discharge circuit) so as to control the abovementioned components.

Figure 2:
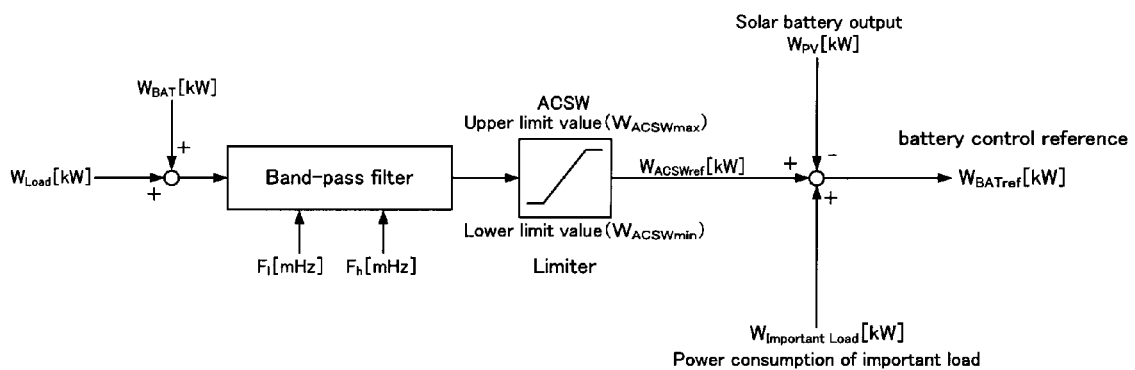
FIG. 2 is a control block diagram of the electric power system according to the embodiment of the present invention.

Next, the control tasks performed in the electric power system according to the present invention configured as described above will be described. FIG. 2 is a control block diagram of the electric power system according to the embodiment of the present invention. The processing based on the control block diagram is executed in the controller 110.

In the control performed in the controller 110, a detection value $W_{Load}$ acquired from the detection section 181 and a detection value $W_{BAT}$ acquired from the detection section 131 are input to the controller 110 and added to each other. Then, the resultant value is made to pass through a band-pass filter. The band-pass filter is a filter for removing a negligible variation in the electric power within a predetermined time period.

The signal passed through the band-pass filter is then input to a limiter. In this limiter, the input value is limited by the upper limit value ($W_{ACSWmax}$) and lower limit value ($W_{ACSWmin}$) of the power flow in the AC switch (ACSW) 120. A signal $W_{ACSWref}$ passed through the limiter is used as a command value for the AC switch (ACSW) 120. Further, an important load power consumption $W_{Impotant\ Load}$ which is a detection value of the electric power detection section 151 and a photovoltaic power supply output voltage $W_{PV}$ which is a detection value of the electric power detection section 141 are added to and subtracted from the $W_{ACSWref}$ respectively, and the resultant value is output to the secondary battery 130 (charge/discharge circuit) as a control signal $W_{BATref}$ for the secondary battery 130.

That is, an output command value for the secondary battery 130 can be calculated using the following equation:

$$(W_{BATref}) = \text{command value } W_{ACSWref} - \text{(output of photovoltaic power supply 140)} + \text{(power consumption of important load 150)}.$$

The (output of photovoltaic power supply 140) is a value acquired as the detection value from the electric power detection section 141, and (power consumption of important load 150) is a value acquired as the detection value from the electric power detection section 151.

According to the electric power system of the present invention, performing output control of the secondary battery 130 allows the power flow in the AC switch (ACSW) 120 constituting the uninterruptible power supply 100 to be controlled adequately, preventing the AC switch (ACSW) 120 from being damaged. This eliminates the need to increase the withstand capacity of the AC switch to be used to thereby suppress the cost. Further, in the case where the output of the distributed power supply such as the photovoltaic power supply is large while the power consumption of the important load is small, the secondary battery is charged. This allows a reduction in the installed capacity of the secondary battery.

Figure 3:
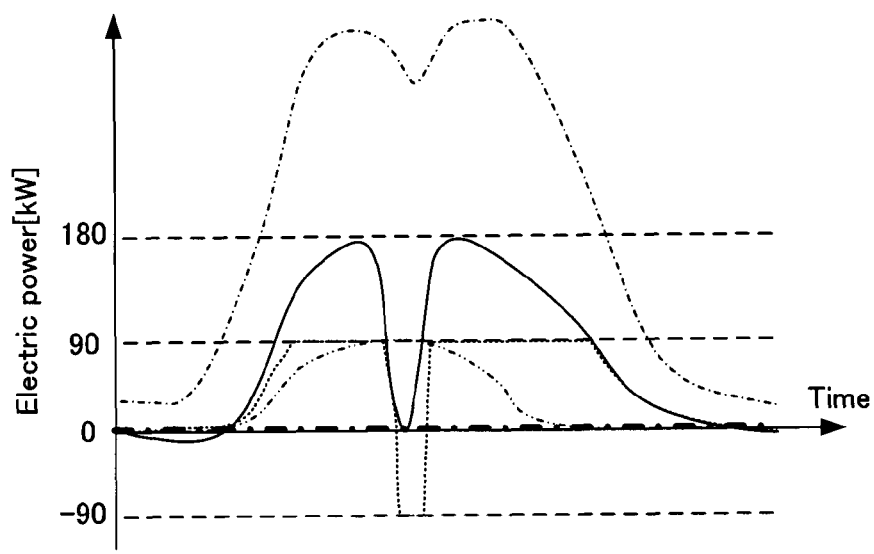
FIG. 3 is a view illustrating an example of the power flow at fine weather based on the control according to a conventional technique.

A control example based on the electric power system according to the present invention will be described. FIG. 3 is a view illustrating an example of the power flow at fine weather based on the control according to a conventional approach, FIG. 4 is a view illustrating an example of the power flow at cloudy/rainy weather based on the control according to a conventional technique, FIG. 5 is a view illustrating an example of the power flow at fine weather based on the control according to the electric power system of the present invention, and FIG. 6 is a view illustrating an example of the power flow at cloudy/rainy weather based on the control according to the electric power system of the present invention.

Throughout the drawings, a thin chain line represents the power consumption of all the loads, a thin solid line represents the power flow in the AC switch (ACSW) 120, a thin dotted line represents electric power charged/discharged by the secondary battery 130, a thin two-dot chain line represents the output of the photovoltaic power supply 140, and a thick chain line represents the power consumption of the important load 150.

Figure 4:
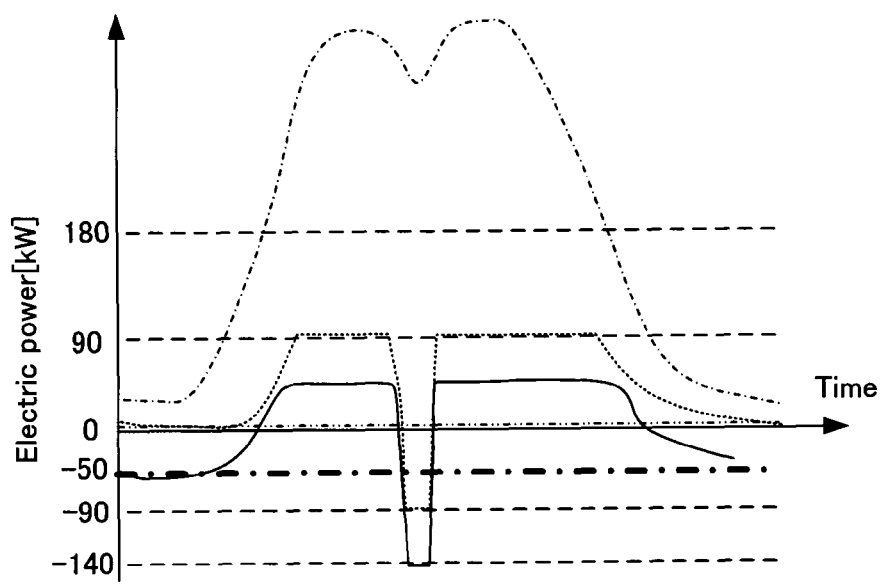
FIG. 4 is a view illustrating an example of the power flow at cloudy/rainy weather based on the control according to a conventional technique.
Figure 5:
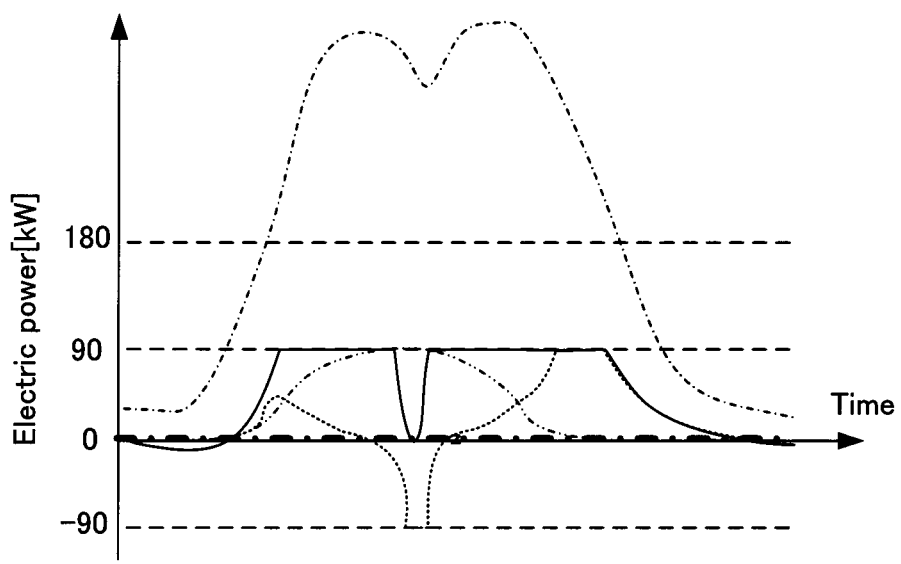
FIG. 5 is a view illustrating an example of the power flow at fine weather based on the control according to the electric power system of the present invention.
Figure 6:
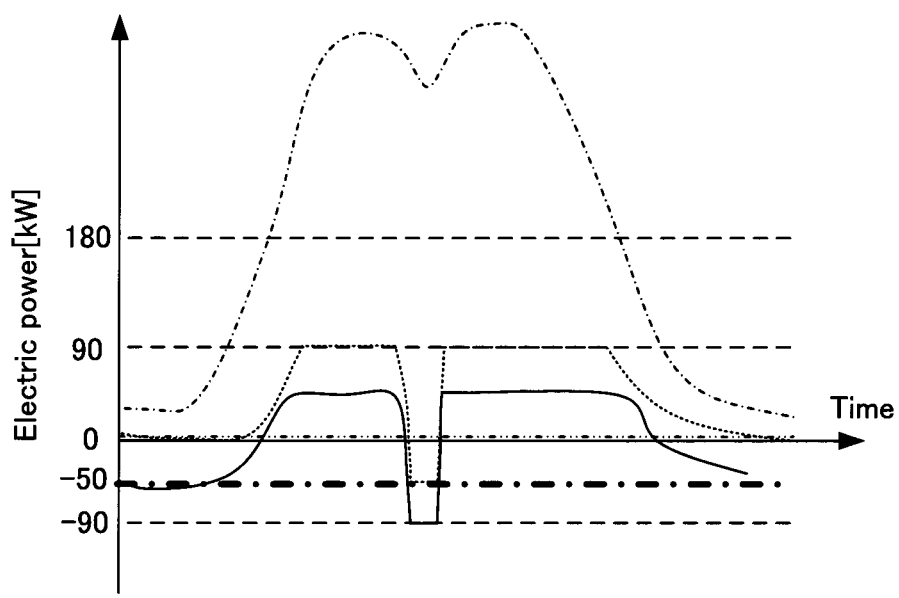
FIG. 6 is a view illustrating an example of the power flow at cloudy/rainy weather based on the control according to the electric power system of the present invention.
Figure 7:
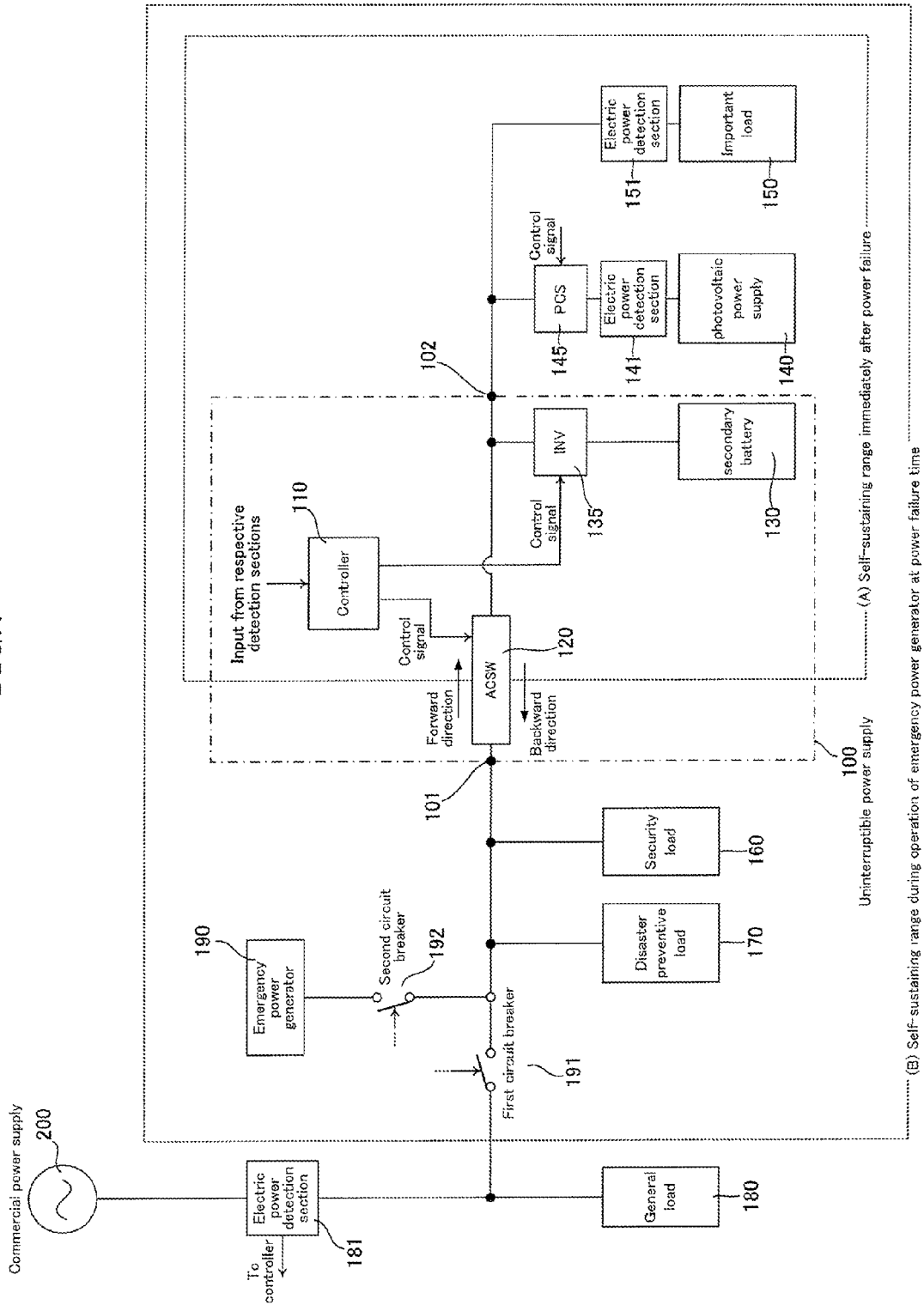
FIG. 7 is a view illustrating a configuration example of a conventional microgrid.

It can be seen from a comparison between FIGS. 3 and 5 and a comparison between FIGS. 4 and 6 that the secondary battery 130 is adequately controlled by the output of the photovoltaic power supply 140 and load electric power of the important load 150 in the electric power system according to the present invention to make the power flow in the AC switch (ACSW) 120 always fall within a range of −90 kW to 90 kW corresponding to its withstand capacity.

Next, another embodiment of the present invention will be described. While the photovoltaic power supply 140 is used as the distributed power supply for constituting the microgrid in the above embodiment, a wind turbine power generation, a secondary battery, a rotary electric power generator, a fuel battery, a waste power generation, cogeneration, and the like are used as the distributed power supply in this another embodiment. The abovementioned distributed power supplies may be used independently or in combination.

As in the case of the abovementioned embodiment, in the present embodiment using the distributed power supply other than the photovoltaic power supply 140, the control signal $W_{BATref}$ for the secondary battery 130 (charge/discharge circuit) is calculated based on the upper limit value and lower limit value in the limiter of FIG. 2 calculated using the following equations:

Upper limit value; $W_{BATmax}$=(upper limit value of AC switch 120)−(output of distributed power supply)+(power consumption of important load 150)

Lower limit value; $W_{BATmin}$=(lower limit value of AC switch 120)−(output of distributed power supply)+(power consumption of important load 150).

Also according to the electric power system of this another embodiment, performing output control of the secondary battery 130 allows the power flow in the AC switch (ACSW) 120 constituting the uninterruptible power supply 100 to be controlled adequately, preventing the AC switch (ACSW) 120 from being damaged. This eliminates the need to increase the withstand capacity of the AC switch to be used to thereby suppress cost increase. Further, in the case where the output of the distributed power supply such as the photovoltaic power supply is large while the power consumption of the important load is small, the secondary battery is charged. This allows a reduction in the installed capacity of the secondary battery.

Industrial Applicability

According to the electric power system of the present invention, it is possible to adequately control the power flow in the AC switch (120) constituting the uninterruptible power supply, making it possible to construct an electric power system at low cost without using an expensive AC switch (120) having a high withstand capacity, which provides a better industrial applicability.

The invention claimed is:

1. An electric power system comprising:
  an uninterruptible power supply including an AC switch provided between a commercial power supply and an output part, a secondary battery, and an inverter provided between the AC switch and secondary battery;

an important load connected to the output part;

a distributed power supply connected to the output part;

total load power consumption detection means for detecting the power consumption of all loads including the important load;

charge/discharge power detection means for detecting charge/discharge power of the secondary battery;

output power detection means for detecting the output power of the distributed power supply;

important load power consumption detection means for detecting the power consumption of the important load; and a controller that inputs thereto detection values from the total load power consumption detection means, charge/discharge power detection means, output power detection means, and important load power consumption detection means and outputs a control command value for controlling the secondary battery, wherein the controller adds the detection values from the total load power consumption detection means and the charge/discharge power detection means, passes the added detection values into a band-pass filter outputting a filtered signal, and inputs the filtered signal into a limiter limiting the inputted signal by maximum and minimum limit values for power flow in the AC switch, and wherein the controller determines the control command value for operating the secondary battery based on the equation: (command value $W_{ACSWref}$)−(the detection value of the output power detection means)+(the detection value of the important load power consumption detection means), the command value $W_{ACSWref}$ being the output from the limiter.

* * * * *